United States Patent
Loui et al.

(10) Patent No.: US 11,841,082 B2
(45) Date of Patent: Dec. 12, 2023

(54) SOLENOID ACTUATED LOCKING PAWL WITH COMPLIANCE MECHANISM

(71) Applicant: Magna Powertrain Inc., Concord (CA)

(72) Inventors: Tak Man Loui, Richmond Hill (CA); Adrian Cioc, North York (CA); Romulus Crisan, Toronto (CA); Stephen Yang, Toronto (CA); Dusan Milacic, North York (CA); Sean Steele, Mississauga (CA); Myron Samila, Toronto (CA)

(73) Assignee: Magna Powertrain Inc., Concord (CA)

( * ) Notice: Subject to any disclaimer, the term of this patent is extended or adjusted under 35 U.S.C. 154(b) by 97 days.

(21) Appl. No.: 17/605,087

(22) PCT Filed: May 6, 2020

(86) PCT No.: PCT/CA2020/050614
§ 371 (c)(1),
(2) Date: Oct. 20, 2021

(87) PCT Pub. No.: WO2020/227818
PCT Pub. Date: Nov. 19, 2020

(65) Prior Publication Data
US 2022/0186831 A1 Jun. 16, 2022

Related U.S. Application Data (60) Provisional application No. 62/851,830, filed on May 23, 2019, provisional application No. 62/846,169, filed on May 10, 2019.

(51) Int. Cl.
*F16H 63/34* (2006.01)

(52) U.S. Cl.
CPC ..... *F16H 63/3425* (2013.01); *F16H 63/3475* (2013.01)

(58) Field of Classification Search
CPC ..... F16H 63/3416–3483; F16H 63/3458–3475
See application file for complete search history.

(56) References Cited

U.S. PATENT DOCUMENTS 10,407,041 B2 * 9/2019 Heubner ............. F16H 63/3466
11,085,536 B2 * 8/2021 Kisielewicz ........ F16H 63/3425
(Continued)

FOREIGN PATENT DOCUMENTS

CN 1201727 A 12/1998
CN 102062161 A 5/2011
(Continued)

OTHER PUBLICATIONS

Chinese Office Action for Application No. 202080034404.6 dated Jan. 12, 2023.

*Primary Examiner* — Ernesto A Suarez
*Assistant Examiner* — James J Taylor, II
(74) *Attorney, Agent, or Firm* — Warn Partners, P.C.

(57) ABSTRACT

A locking pawl arrangement with a motion compliance mechanism for use with various automotive devices having a rotating hub with a plurality of teeth. There is provided a pawl that is moveable between a disengaged position wherein the pawl is not engaged with the rotating hub, an engaged positioned where the pawl is engaged with the hub and an intermediate position that is between the disengaged position and engaged position. A locking cam is in contact with the pawl and moves between a disengaged position, an engaged position, and an intermediate position against the pawl. There is further provided an actuator that is engageable with the locking cam. The actuator moves between a retracted position and an extended position, thereby causing the locking cam to move the pawl between the intermediate position, disengaged position and engaged position.

3 Claims, 13 Drawing Sheets

(56) References Cited

U.S. PATENT DOCUMENTS

| | | | |
|---|---|---|---|
| 11,215,282 B2* | 1/2022 | Klein | F16H 63/3483 |
| 11,708,899 B2* | 7/2023 | Williams | F16H 63/3425 |
| | | | 192/219.5 |
| 2012/0000743 A1* | 1/2012 | Wittkopp | F16H 63/3425 |
| | | | 192/219.1 |
| 2019/0221348 A1* | 7/2019 | Kelly | H01F 7/081 |

FOREIGN PATENT DOCUMENTS

| | | |
|---|---|---|
| CN | 103427352 A | 12/2013 |
| CN | 104179968 A | 12/2014 |
| CN | 104235356 A | 12/2014 |
| DE | 102015212563 A1 | 1/2017 |
| WO | 2018046901 A1 | 3/2018 |

* cited by examiner

SOLENOID ACTUATED LOCKING PAWL WITH COMPLIANCE MECHANISM

FIELD OF THE INVENTION

The present invention relates to a solenoid actuated locking pawl arrangement with a motion compliance mechanism for use in an automotive drive system.

BACKGROUND OF THE INVENTION

Automobiles utilize a drive and engine system that typically involves the use of a rotating gear or hub that assists in converting rotational motion to linear motion of the vehicle. Such hubs are often found in transmission components or sometimes on the engine shaft itself. Many electrical vehicles today also utilize hubs as part of the motor and transmission elements. There is a need to selectively lock and unlock the hubs during different conditions. The hubs have teeth that are separated by tooth space. One way of locking and unlocking the hub to prevent rotation by selectively moving a wedge piece into the tooth space to lock the hub from rotating in all directions. Such lock mechanisms take up a substantial amount of space because it can require bulky actuators or wedge mechanisms. It is an object of the invention to provide a smaller arrangement utilizing a linear actuator, such as a solenoid actuator. However, solenoid actuators work best when they are free to move through the entire stroke of movement without being stopped, which can damage or wear out the actuator. Therefore, it is further an object of the invention to provide a motion compliance feature between the shaft of the actuator that maintains force on the lock components when they cannot be fully engaged, but also allows the linear actuator to move through its full stroke.

SUMMARY OF THE INVENTION

The present invention is directed to a locking pawl arrangement with a motion compliance mechanism for use with various automotive devices having a rotating hub with a plurality of teeth. The rotating hub includes tooth space between each of adjacent pair of the plurality of teeth. There is further provided a pawl that is moveable between a disengaged position wherein the pawl is not engaged with the rotating hub, an engaged positioned where the pawl is engaged with the hub and an intermediate position that is between the disengaged position and engaged position. A locking cam is in contact with the pawl and moves between a disengaged position, an engaged position, and an intermediate position against the pawl. There is further provided an actuator that is engageable with the locking cam. The actuator moves between a retracted position and an extended position, thereby causing the locking cam to move the pawl between the intermediate position, disengaged position and engaged position.

BRIEF DESCRIPTION OF THE DRAWINGS

The present invention will become more fully understood from the detailed description and the accompanying drawings, wherein.

2

DETAILED DESCRIPTION OF THE PREFERRED EMBODIMENTS

The following description of the preferred embodiments is merely exemplary in nature and is in no way intended to limit the invention, its application, or uses.

Referring now to FIGS. 1-4 an actuated locking pawl arrangement 10 with a motion compliance mechanism 12 is shown. The actuated locking pawl arrangement 10 is for use with an automotive system generally, and can be implemented on a number of different areas, such as but not limited to transmissions, parking brakes, electric motors, electric vehicle powertrains, safety belts, vehicle closures such as trunks, hoods, doors and in window and convertible actuators. The actuated locking pawl arrangement 10 includes a hub 14 that is a bidirectional rotating hub that can rotate in either the clockwise direction or the counter clockwise direction, however in some applications the hub 14 is only configured to rotate in a single direction.

The hub 14 has a plurality of teeth 16 separated by a tooth space 18 shown in the figures between an adjacent pair A, B of the plurality of teeth 16. While only a single tooth space is labelled it is to be understood that there is a tooth space separating each adjacent tooth on the hub 14. The tooth space 18 (as well as all the tooth spaces on the hub 14) includes a front tooth profile 20 and a back tooth profile 22.

Near the hub 14 is a pawl 24 connected to and rotatable about a post 26. The pawl 24 is movable or rotatable between an disengaged position shown in FIG. 1, where the pawl 24 is not engaged with the hub 14, a engaged position shown in FIG. 2, where the pawl 24 is engaged with the hub and partially positioned within one tooth space 18, and an intermediate position shown in FIG. 3 that is located between the disengaged position and the engaged position, where the pawl 24 is in contact with the hub 14 but not in any tooth space. The pawl 24 is rotationally biased by a spring 28 connected between the body of the pawl 24 and a ground (e.g., housing, post, or some other stationary surface) to bias the pawl 24 to the disengaged position.

In the embodiment shown in FIGS. 1-4 the hub 14 rotates bidirectional so that when the pawl 24 is in the engaged position it is desirable to have a pawl head 30 of the pawl 24 fit tightly one tooth space 19 to so the pawl 24 prevents the hub 14 from rotating. The pawl head 30 has a front pawl profile 32 and a back pawl profile 34, wherein the back pawl profile 34 has a shape that matches the back tooth profile 22 of each tooth space 18. The front pawl profile 32 of the pawl head 30 matches the front tooth profile 20 of each tooth space 18 so that the pawl head 30 fits into the tooth space 18 tightly to prevent any backlash of the hub 14. To prevent any movement of the hub 14, whether by backlash or other factors, each front tooth profile 20 of all the plurality of teeth 16 has a first depth angle or slope and each back tooth profile 22 of all the plurality of teeth 16 have a second depth angle or slope so that the first depth angle is different from the second depth angle. The reason for the difference in first depth angle and the second depth angle is that the engagement radius of the hub 14 and where the pawl head 30 contacts the hub 14 is different and requires that the front tooth profile 20 and back tooth profile 22 be different and have different depth angles to ensure that the pawl head 30 property seats in the tooth space, which is moving radially. In other words, different angles are needed on the front tooth profile 20 and back tooth profile 22 because of the way the hub 14 is rotating and the way the pawl head 30 is making contact in any given tooth space 18. Depending on the design of the actuated locking pawl arrangement 10 the first depth angle of the front tooth profile 20 and second depth angle of the back tooth profile 22 will depend on several factors including one or more factors selected from the group consisting of diameter of the bidirectional rotating hub 14, the number of the plurality of teeth, a depth of the tooth space and the location and angle of engagement of the pawl head.

The actuated locking pawl arrangement 10 also includes a locking cam 36 with a surface 38 in contact with the pawl 24. The locking cam 36 is rotatably connected to a post 40 and moves between a disengaged position shown in FIG. 1, an engaged position, shown in FIGS. 2-3 and an intermediate position show in FIG. 4 that is between the disengaged position and the engaged position. The locking cam 36 serves as an intermediate piece for transferring force between an actuator 42 and the pawl 24. A spring 44 is connected about the post 40 and connect between the locking cam 36 and a ground (e.g., housing, post or some other stationary surface) and biases the locking cam toward the disengaged position when the actuator 42 is not acting on the locking cam 36.

Figure 1:
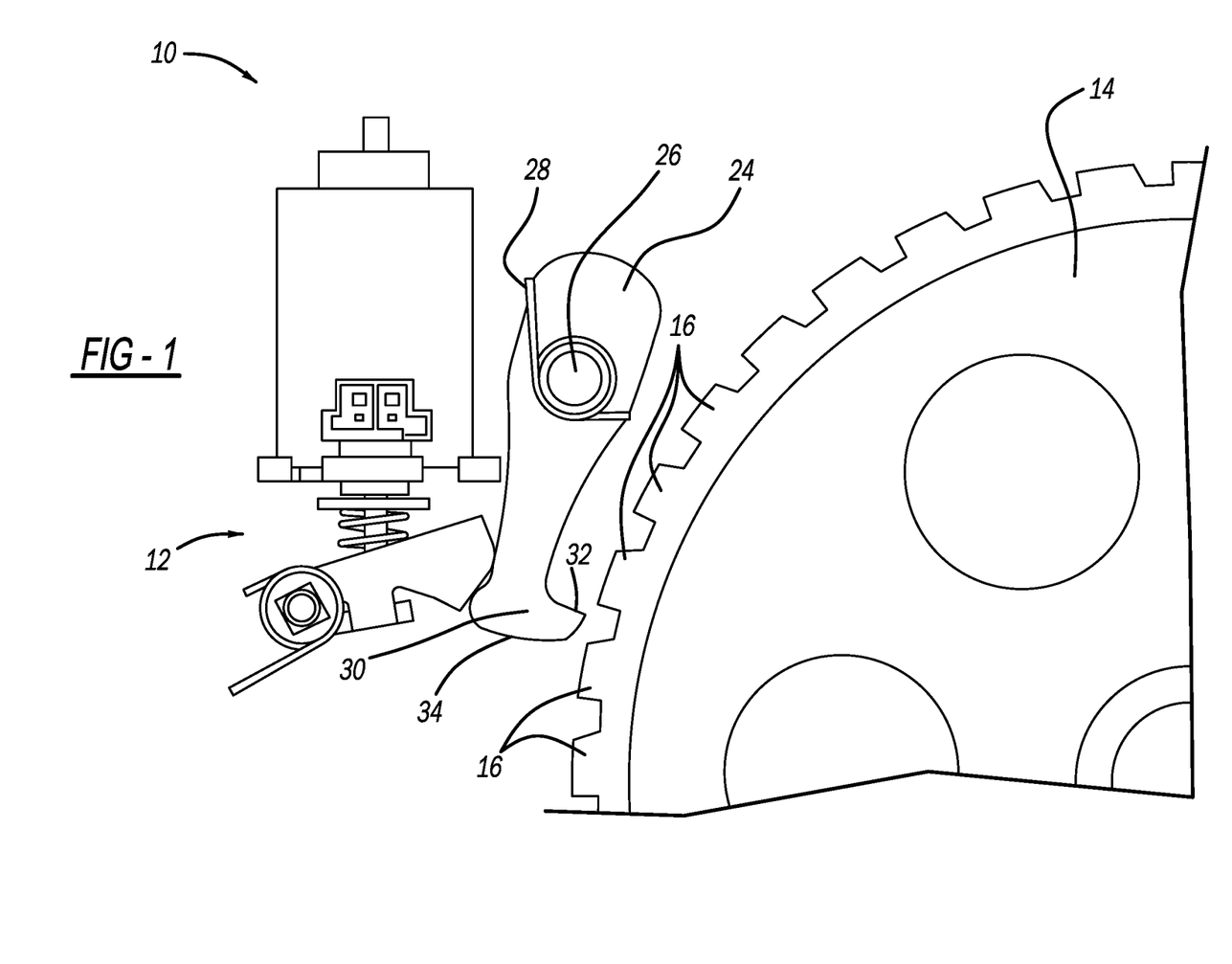
FIG. 1 is a side schematic plan view of the actuated locking pawl arrangement with motion compliance mechanism shown in the disengaged position.
Figure 2:
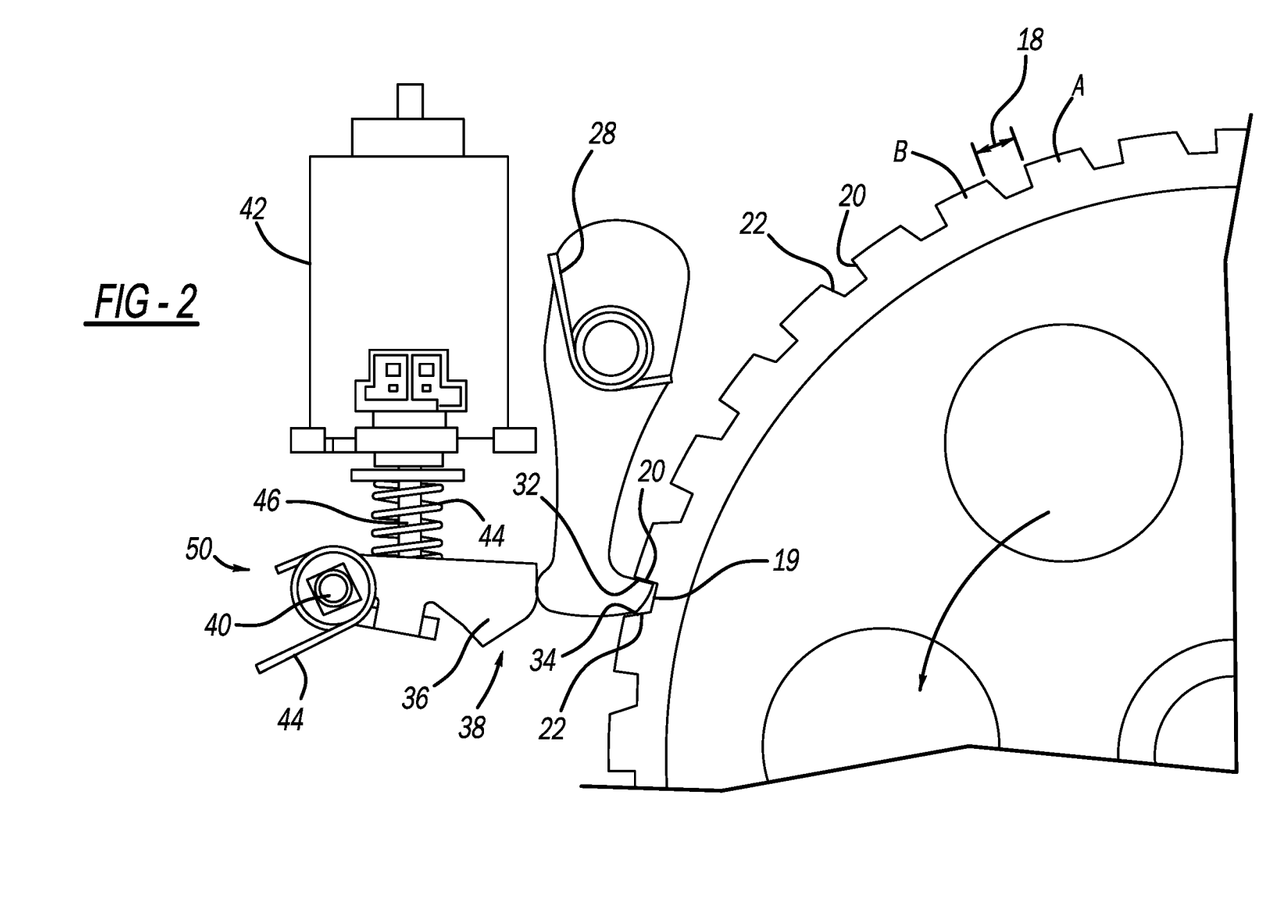
FIG. 2 is a side schematic plan view of the actuated locking pawl arrangement with motion compliance mechanism shown in the engaged position.
Figure 3:
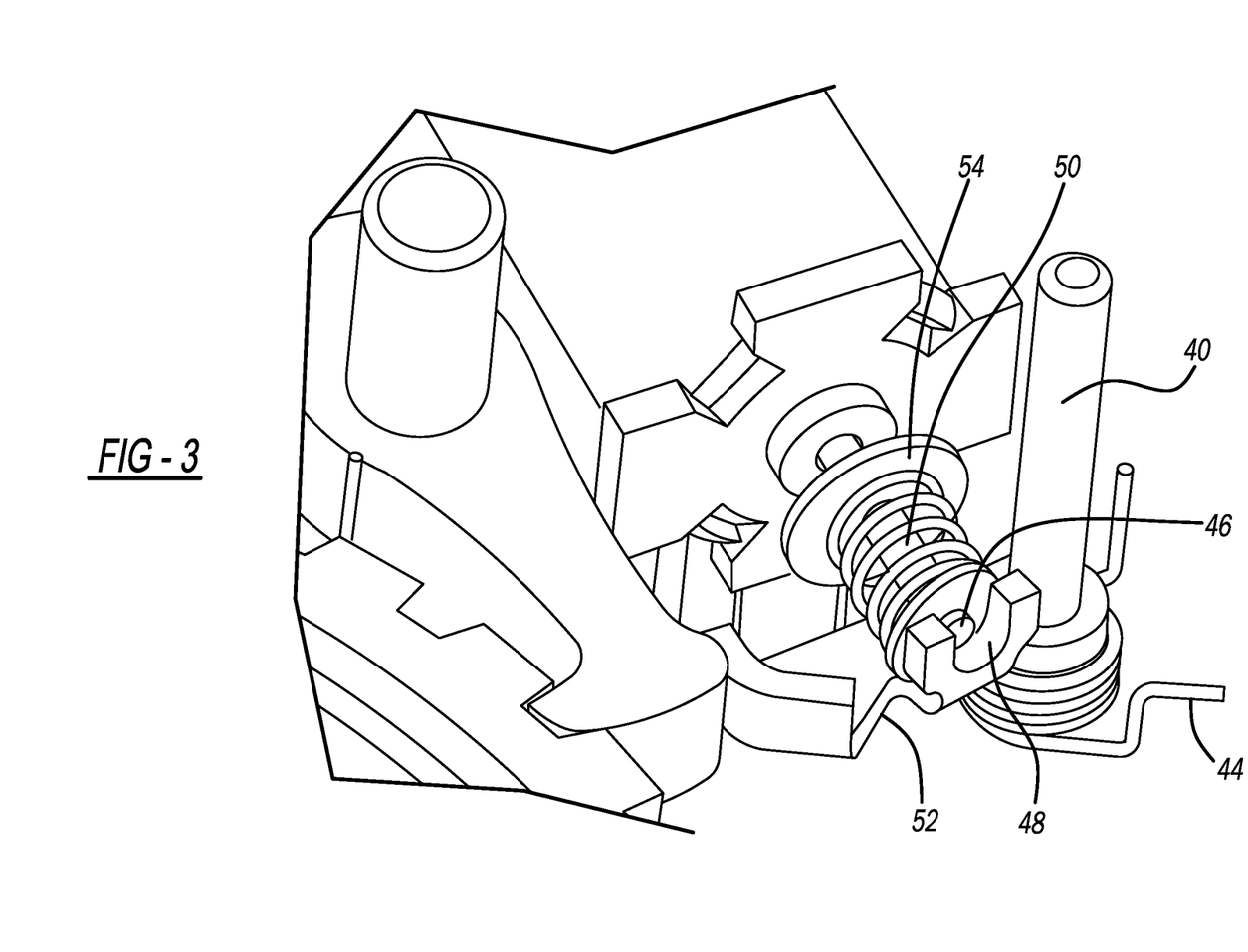
FIG. 3 is an enlarged bottom schematic perspective view of the actuated locking pawl arrangement with motion compliance mechanism shown in the engaged position.
Figure 4:
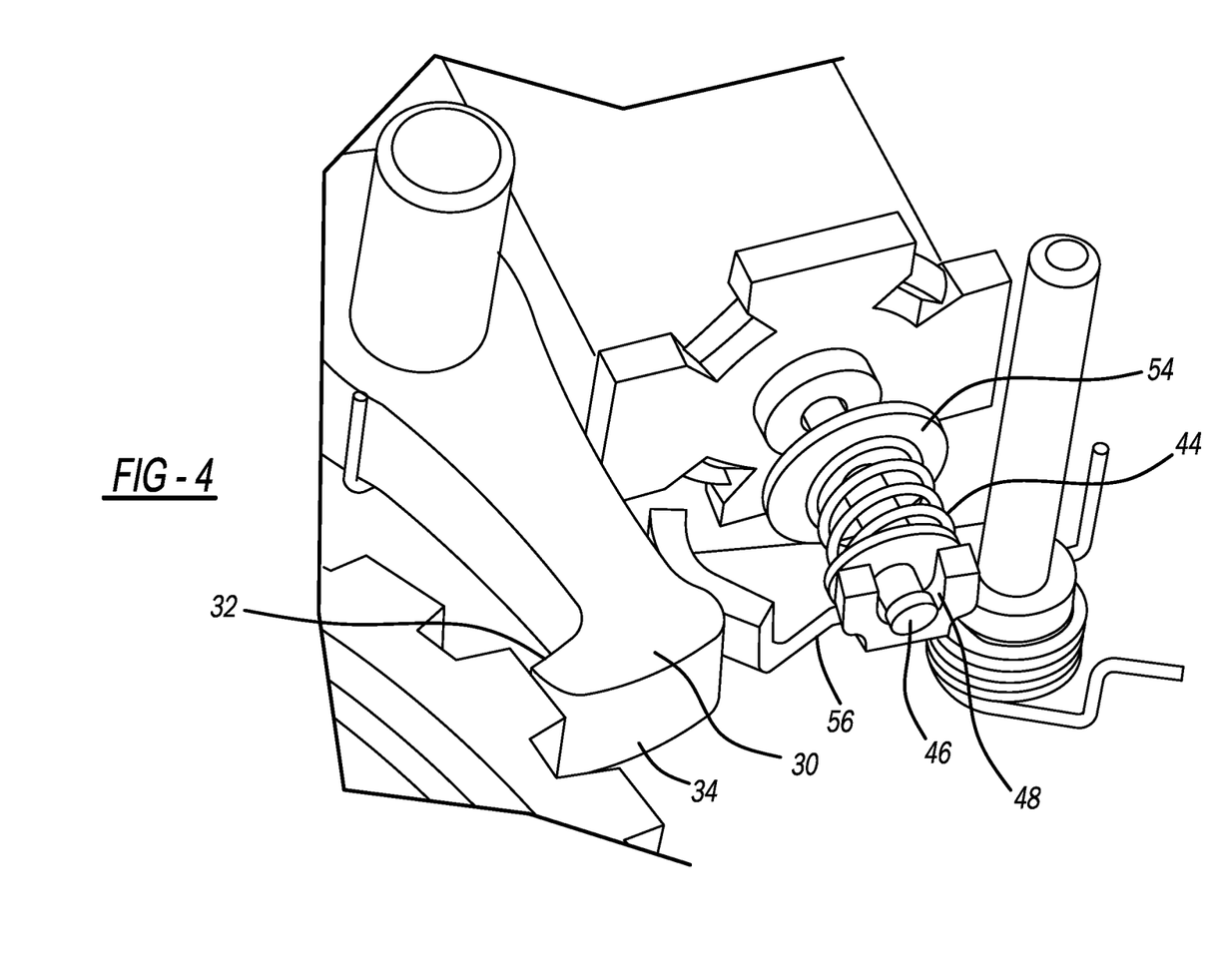
FIG. 4 is an enlarged bottom schematic perspective view of the actuated locking pawl arrangement with motion compliance mechanism shown in the intermediate position.

The actuator 42 is connected to the locking cam 36 and moves between a retracted position, shown in FIG. 1 and an extended position shown in FIGS. 2-4. In a preferred embodiment of the invention the actuator 42 is a linear actuator and is depicted in the drawings as a solenoid actuator. While a solenoid actuator is shown it is within the scope of this invention for other linear actuators to be used such as one selected from the group comprising a solenoid actuator, screw actuator, cam actuator, hydraulic piston actuator, pneumatic cylinder actuator and linear servo actuator. The actuator 42 has a shaft 46 that moves linearly between the retracted position and the extended position. The shaft 46 aligns with an aperture 48 on the locking cam 36, where the shaft 46 will move through the aperture 48 to the engaged position when the locking cam is in the intermediate position, as shown in FIG. 4 and cannot move to the engaged position as shown in FIG. 3, which occurs when the pawl head 30 cannot move into the tooth space 18 and is in contact with one of the plurality of teeth 16 of the hub 14. This protects the actuator 42 from damage or wear by allowing the actuator 42 to move through a full range of movement even when full movement of the pawl 24 is blocked.

The actuated locking pawl arrangement 10 also includes a motion compliance mechanism 50 connected between the actuator 42 and the locking cam 36 that allows the actuator 42 to move to the extended position when the locking cam 36 cannot move past the intermediate position. The motion compliance mechanism maintains a force on the locking cam 36 until the hub 14 moves to a position where the pawl head 30 moves to the engaged position and the locking cam 36 moves to the engaged position as a result of the force applied by the motion compliance mechanism 50.

As show in best in FIGS. 3-4 the motion compliance mechanism 50 includes a compression spring 52 disposed about the shaft 46 and retained between an upper washer 54 that is fixed to the shaft 46 and a lower washer 56 that is capable of sliding on the shaft 46 so that if the locking cam 36 cannot move past the intermediate position the shaft 46 will slide through the lower washer 56 and through the aperture 48 in the locking cam 36 to allow the shaft 46 to move the extended position. When this occurs the compression spring 52 will become compressed between the upper washer 54 and the lower washer 56 which is abutted against the locking cam 36 in order to provide the force. The lower washer 56 as shown has a flat surface contacting the compression spring 52, however, it is within the scope of this invention to have either a flat face or conical/spherical face contacting the locking cam 36. The benefit of using a conical/spherical shape is that there would be more contact area between the conical/spherical surface and locking cam 36, in addition to the conical face providing smoother motion versus a flat washer as it will roll on the surface between the conical/spherical surface and locking cam 36. The use of the motion compliance mechanism 50 allows for more compact and efficient actuator, such as a solenoid actuator to be used, while protecting the solenoid actuator by allowing it to move through its full stroke between the extended and retracted positions without unwanted strikes of the shaft 46 against the locking cam 36, which can damage or reduce the operational life of the actuator 42.

Figure 9:
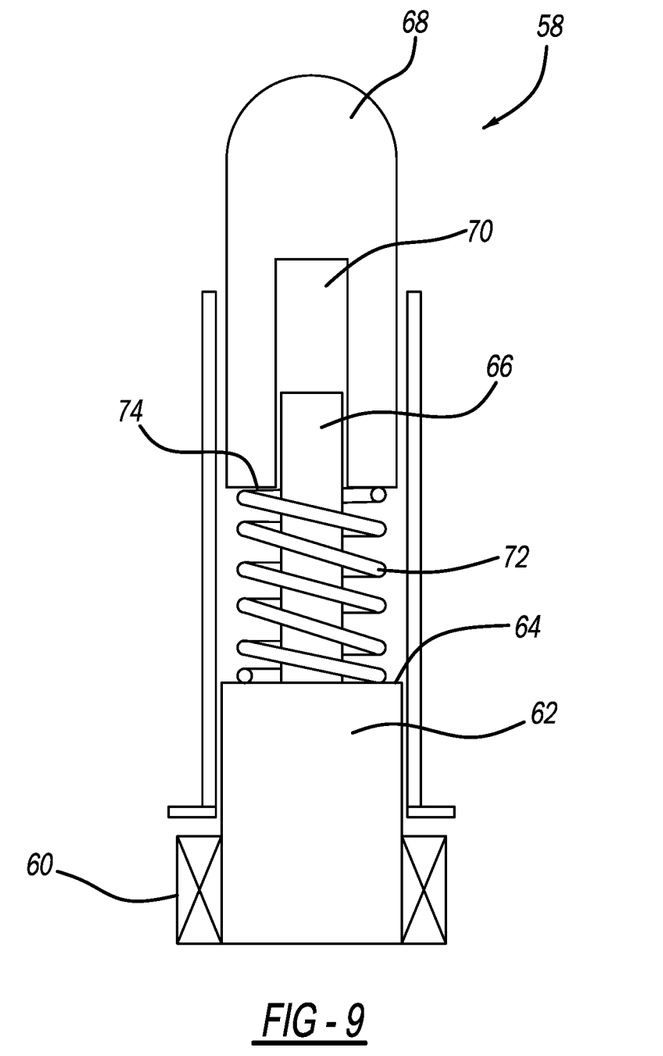
FIG. 9 is a side cross sectional schematic view of an alternate embodiment of the motion compliance mechanism.

Referring now to FIG. 9 there is an alternate embodiment showing a motion compliance mechanism 58 that is an alternate arrangement to the motion compliance mechanism 50 shown in FIG. 3-4. In this embodiment of the invention there is a solenoid actuator 60 having a linearly moveable armature 62 with an upper spring seat surface 64 and a shaft 66 extending from the upper spring seat surface 64 away from the armature 62. The armature 62 and the shaft 66 move linearly between a retracted position and an extended position.

The motion compliance mechanism 58 includes a plunger 68 that contacts the locking cam 36 and moves between an engaged position, a disengaged position and an intermediate position between the engaged position and the disengaged position as a result of the movement of the locking cam 36 moving between the disengaged position, engaged position and intermediate position as described above in FIG. 1-4. The plunger 68 has a blind hole 70 with a depth for receiving a portion of the shaft 66 of the solenoid actuator 60 as the solenoid actuator 60 moves between the extended position and retracted position. A compression spring 72 is disposed about the shaft 66 and is retained between the upper spring seat surface 64 on the armature 62 and a lower spring seat surface 74 on the plunger 68. When the plunger 68 cannot move past the intermediate position, the shaft 66 will slide further into the blind hole 70 of the plunger 68 allowing the shaft 66 to move to the extended position, and the compression spring 72 becomes compressed as the upper spring seat surface 64 moves toward the lower spring seat surface 74 and causes the compression spring 72 to provide the force on the plunger 68. This force is released when the locking cam 36 is able to move to the engaged position as a result of the hub 14 rotating to allow the pawl head 30 to move into the tooth space 18 as described above with respect to FIGS. 1-4.

Referring now to FIGS. 5-8 an alternate embodiment of the invention is shown as and actuated locking pawl arrangement 100 having a U shaped pawl 102. The actuated locking pawl arrangement 100 in one environment is used in the location of an engine started and engages a traditional starter gear. However, it is within the scope of the invention for the locking pawl arrangement 100 to be used with other applications, including a bidirectional rotating hub as described above with regarding to FIGS. 1-4. The actuated locking pawl arrangement includes a hub 104 what is rotating hub having a plurality of teeth 106 and a plurality of tooth spaces 108. In this embodiment of the invention the profile of each of the plurality of teeth 106 is the same on both flanks, thus there is not a difference between the front tooth profile and back tooth profile as described above with respect to FIGS. 1-4. Each one of the plurality of teeth 106 is separated by one of the plurality of tooth spaces 108 such that between each adjacent pair A', B' of the plurality of teeth 106.

The actuated locking pawl arrangement 100 includes a housing 110 having two opposing pawl mounting locations 112, 112'. A U-shaped pawl 102 having a first engagement arm 114 and an second engagement arm 116 are both connected to a body section 118 containing a pivot 120, 120' for pivotally connecting the U-shaped pawl 102 to one of the two opposing pawl mounting locations 112, 112' within the housing 110. The pivot 120, 120' is a post that is placed in or located at each of the mounting locations 112, 112' The U-shaped pawl 102 is rotatable between an disengaged position where one the second engagement arm 116 is not in contact with the rotating hub 104, a engaged position where the second engagement arm 116 is partially positioned in one tooth space of the plurality of tooth spaces 108 and an intermediate position where the second engagement arm 116 is in contact with one or more of the plurality of teeth 106 and is not positioned in any of the plurality to tooth spaces 108.

An actuator 122 is connected to the housing 110 and has a shaft 124 that moves between an extended position and retracted position. The shaft 124 upon movement to the extended position contacts the first engagement arm 114 of the U-shaped pawl 102 and rotates the U-shaped pawl 102 from the disengaged position to the engaged position. Upon movement of the shaft 124 to the retracted position the shaft 124 moves away from and does not contact the first engagement arm 114. A biasing element 126, (shown in FIG. 8) such as a spring connects between the U-shaped pawl 102 and a ground (e.g., housing 110, pivot 120 or other stationary structure) to bias the U-shaped pawl 102 to pivot to the disengaged position.

Figure 5:
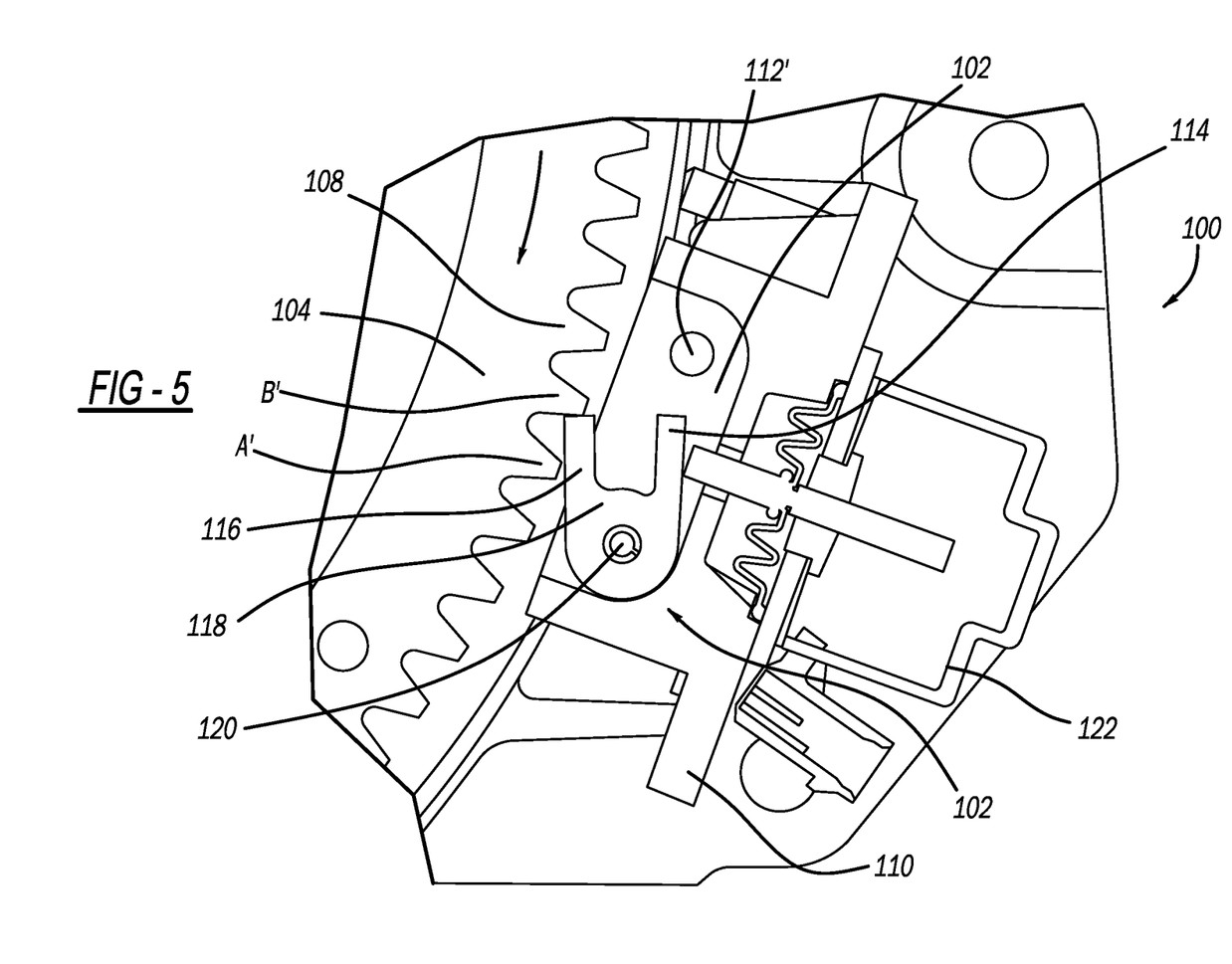
FIG. 5 shows an enlarged cross sectional side plan view of an actuated locking pawl arrangement having a U shaped pawl in the engaged position according to a second embodiment of the invention.
Figure 6:
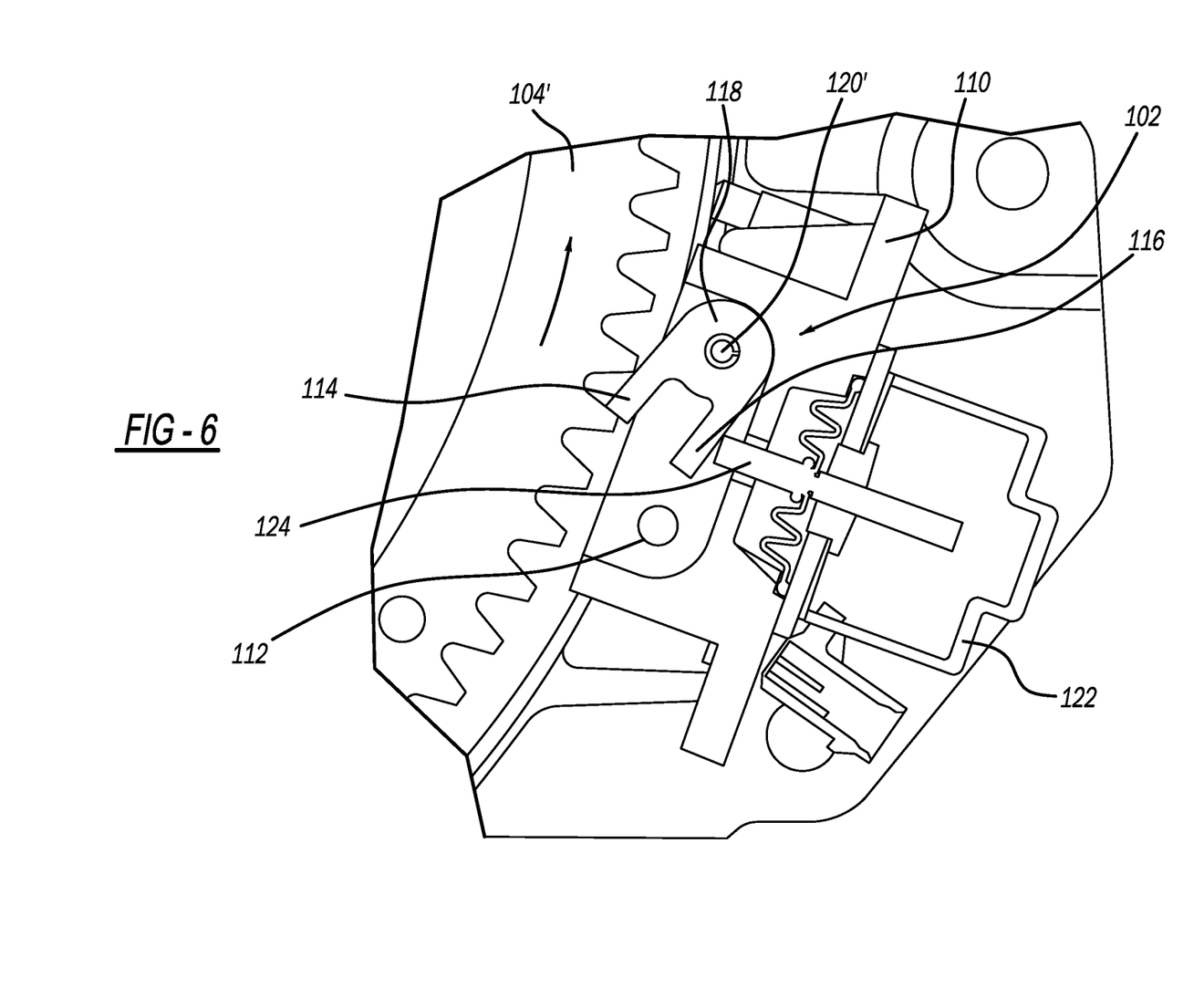
FIG. 6 shows an enlarged cross sectional side plan view of an actuated locking pawl arrangement having a U shaped pawl in the engaged position according to the second embodiment of the invention.

Referring now to FIG. 6 the reversible aspect of the U-shaped pawl 102 is demonstrated. As shown the U-shaped pawl 102 has been moved from pawl mounting location 112 to the pawl mounting location 112'. This allows the U-shaped pawl 102 to lock a hub 104' rotating in the opposite direction shown in FIG. 5. In FIG. 5 the hub 104 rotates in the clockwise direction, while in FIG. 6 the hub 104' rotates in the counter clockwise direction. Also moving the U-shaped pawl 102 changes the orientation such that in FIG. 6 the first engagement arm 114 is in contact with the hub 104, while the second engagement arm 116 is in contact with the shaft 124 of the actuator 122.

Figure 8:
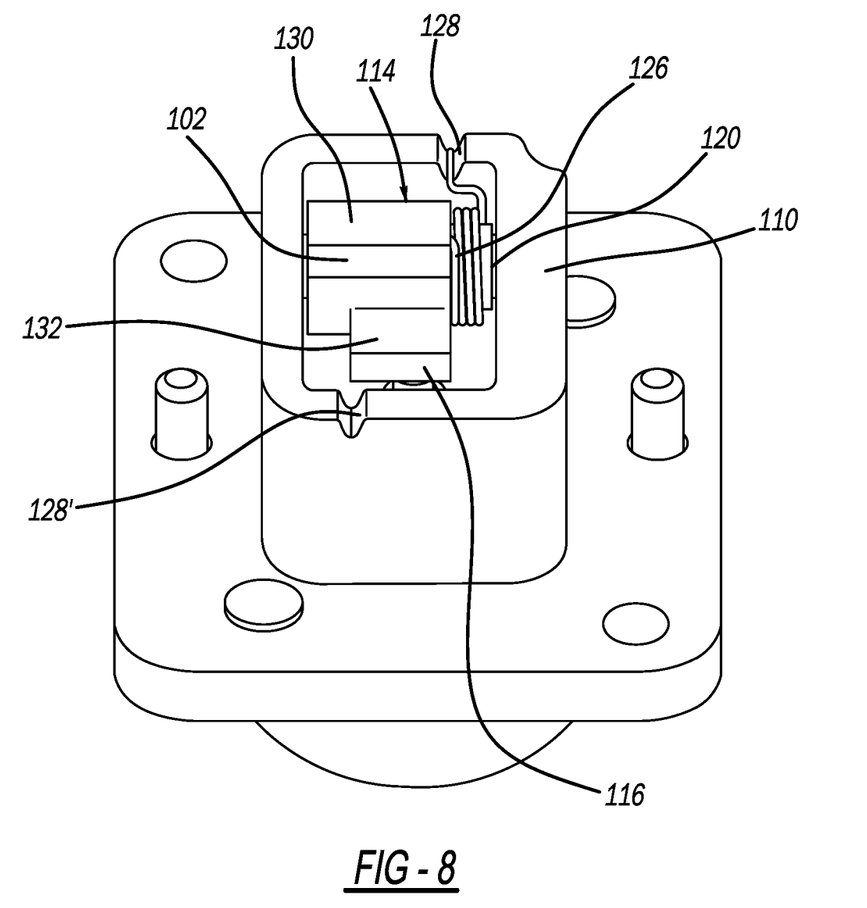
FIG. 8 shows an enlarged end perspective view of a housing containing the actuated locking pawl arrangement having a U shaped pawl according to a second embodiment of the invention.

FIG. 8 shows an end view of the housing 110 with the U-shaped pawl 102 located in the housing 110. The housing 110 has two notches 128, 128' that accommodate a portion of grounding the spring 126 depending on which pawl mounting location 112, 112' is used. Also, the first engagement arm 114 has a width 130 that is wider than a width 132 the second engagement arm 116. The reason for this is that the smaller width of 130 is possible because the location of the shaft 124 makes having equal widths unnecessary. This provides an additional weight and cost savings that is provided by the current embodiment.

Figure 7:
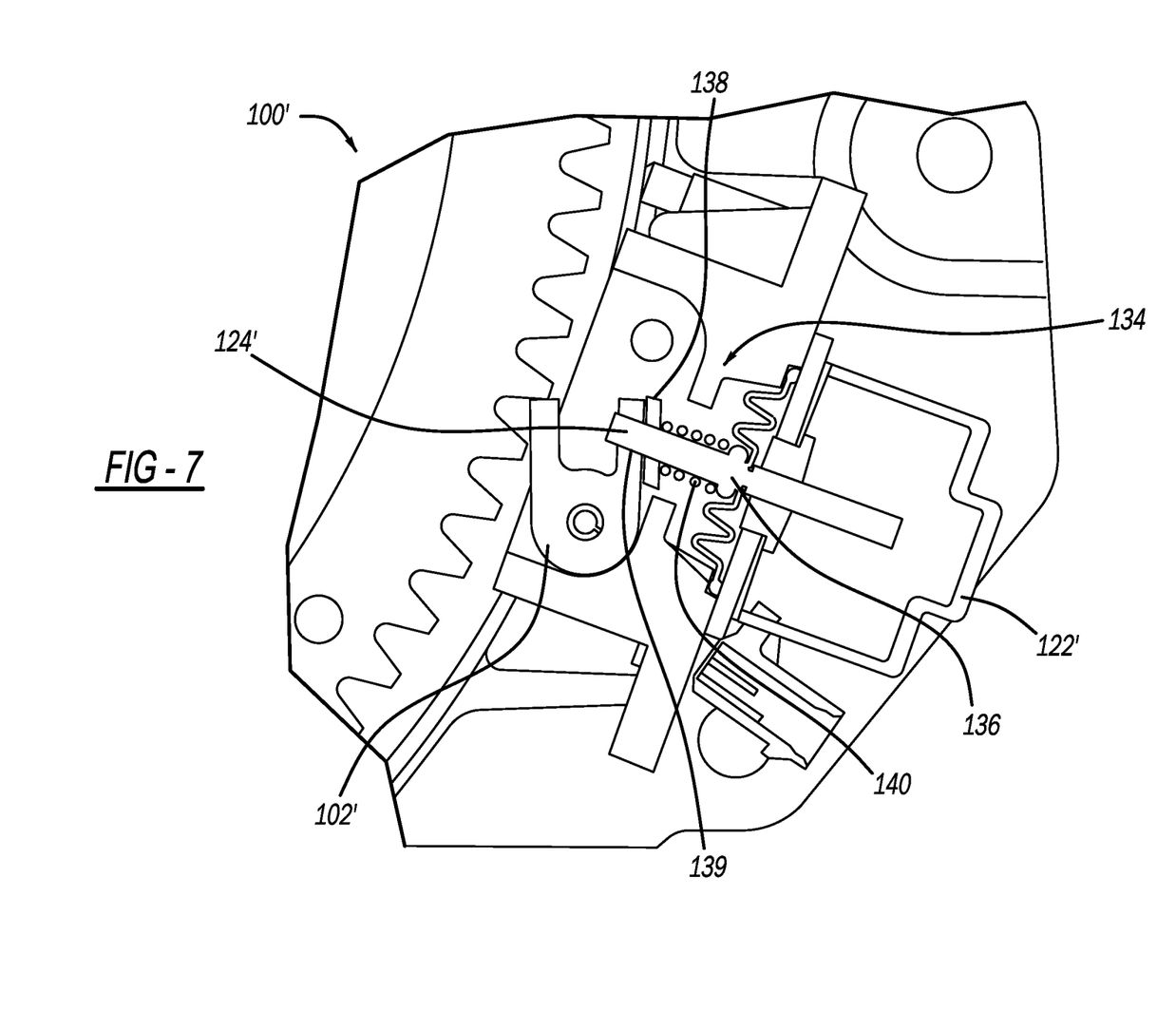
FIG. 7 shows an enlarged cross sectional side plan view of an actuated locking pawl arrangement having a U shaped pawl having a motion compliance mechanism according to another aspect of the second embodiment of the invention.

Referring to FIG. 7 another embodiment, an actuated locking pawl arrangement 100' has a motion compliance mechanism 134. The motion compliance mechanism 134 has a spring 140 located about a shaft 124' of the actuator 122'. The spring 140 is held onto the shaft 124' by a spring seat 136 and a washer 138 that slides on the shaft 124. The washer 138 is in contact with a U-shaped pawl 102' as the actuator 122' moves to the extended position. If the U-shaped pawl 102' cannot move to the engaged position the shaft 124 will slide through an aperture 139 in the U-shaped pawl 102' and move to the extended position, allowing the motion compliance mechanism 134 to maintain force on the U-shaped pawl 102' similar to the motion compliance mechanism 12 described in FIGS. 1-4.

Figure 10:
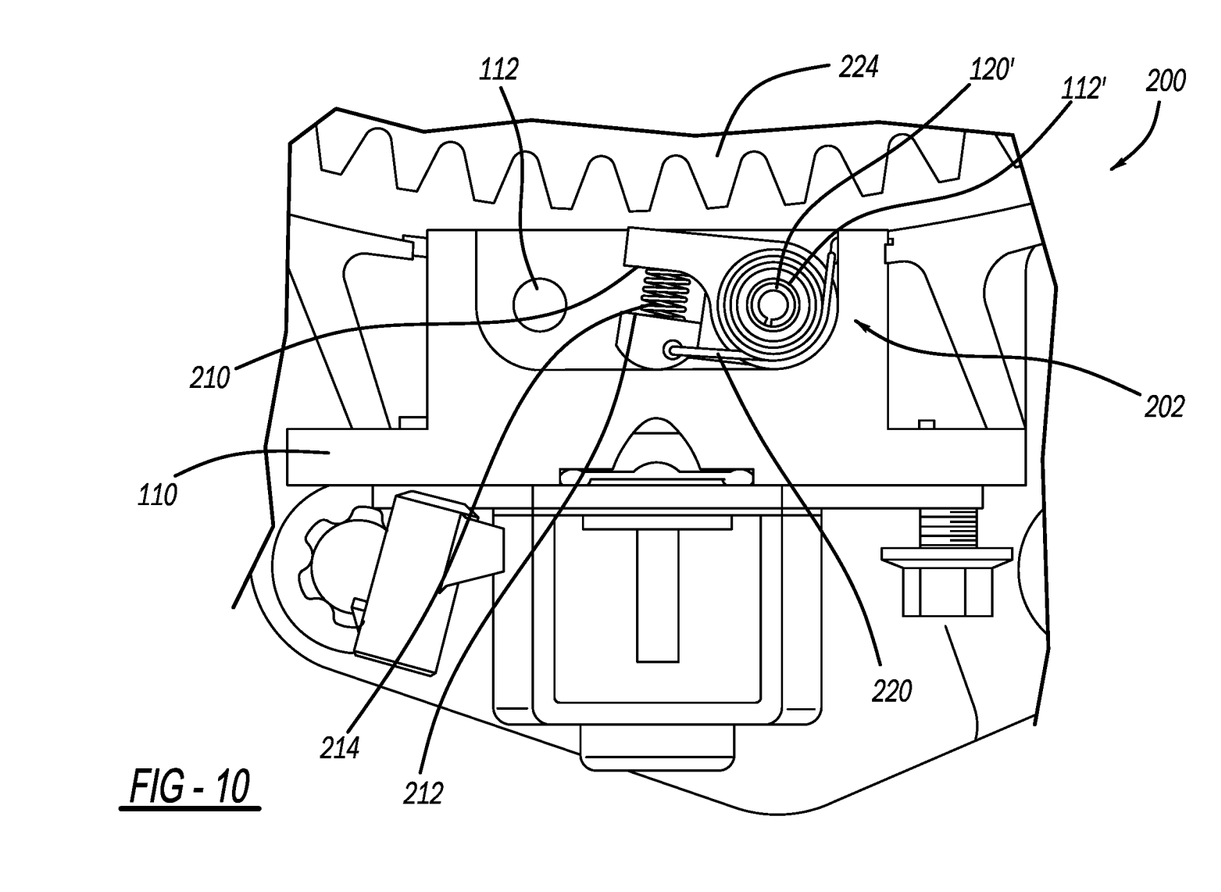
FIG. 10 depicts an enlarged cross sectional side plan view of a compliant pawl in the tucked position according to a third embodiment of the invention.
Figure 11:
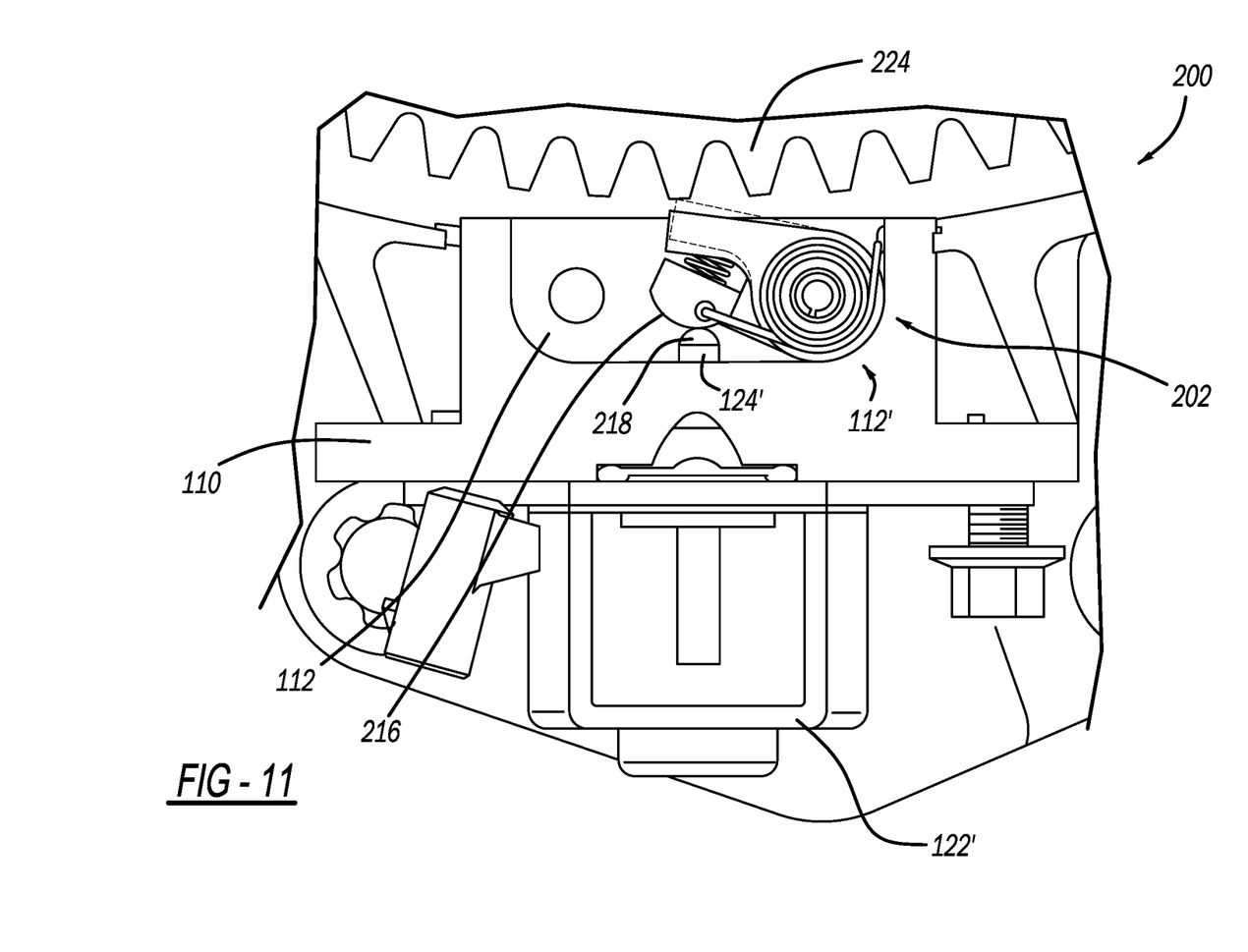
FIG. 11 depicts an enlarged cross sectional side plan view of a compliant pawl in the ratcheting position according to the third embodiment of the invention.
Figure 12:
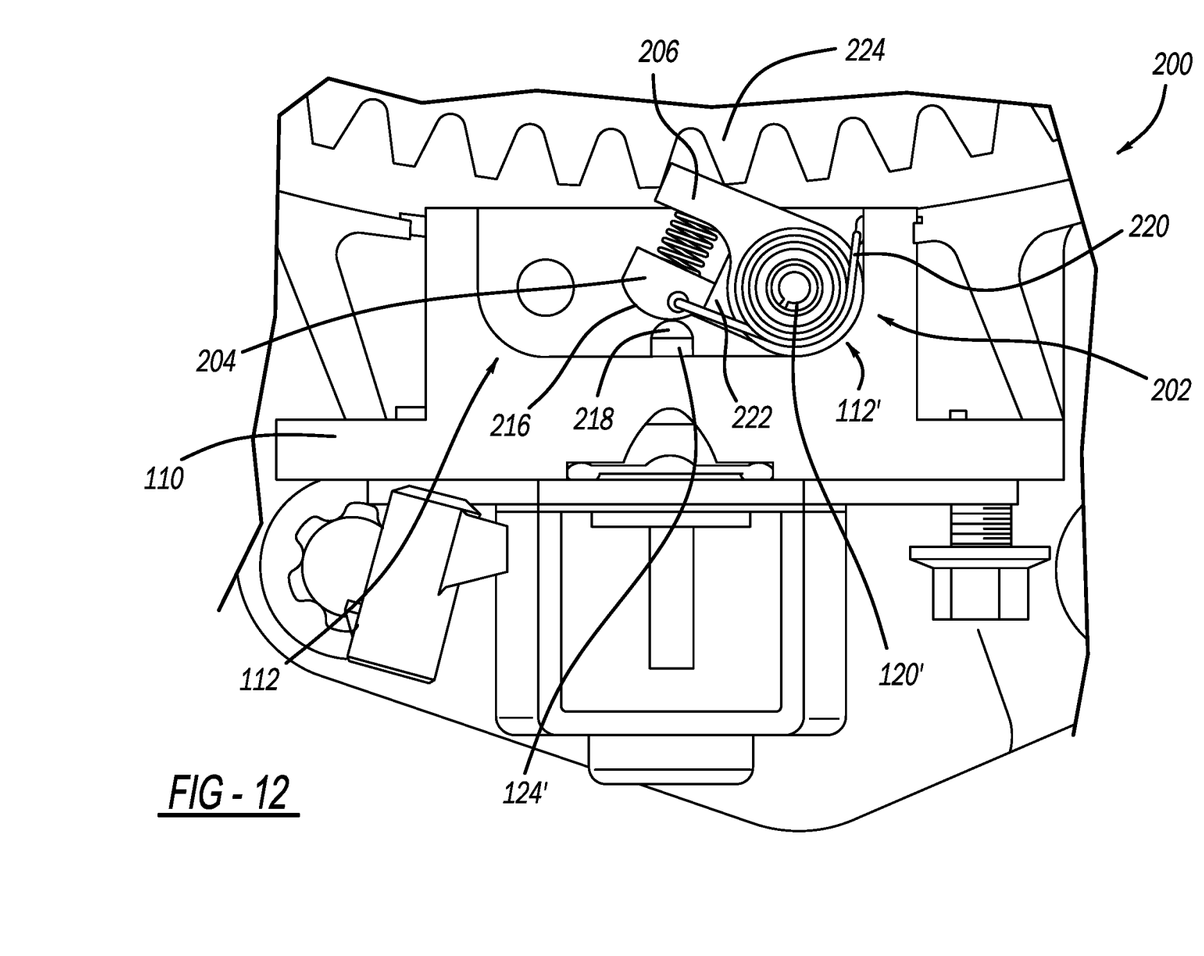
FIG. 12 depicts an enlarged cross sectional side plan view of a compliant pawl in the engaged position according to the third embodiment of the invention.

FIGS. 10-12 depict an enlarged cross sectional side plan view of an actuated locking pawl arrangement 200 according to a third embodiment of the invention. This embodiment utilizes the same housing 110, a pivot 120', pawl mounting locations 112, 112', an actuator 122' and shaft 124' similar to those shown in FIGS. 5-8 above, therefore like reference numbers from FIGS. 5-8 have been carried over and used in FIGS. 10-12. The actuated locking pawl arrangement 200 has a two piece pawl 202 that moves between a disengaged position shown in FIG. 10, an engaged position shown in FIG. 12 and a ratcheting position shown in FIG. 11 all with respect to a gear 224 that is rotatable. It is contemplated that the gear 224 in the present invention is part of an engine brake system, however, it is possible for the actuated locking pawl arrangement 200 to be used in other systems described above.

Figure 13:
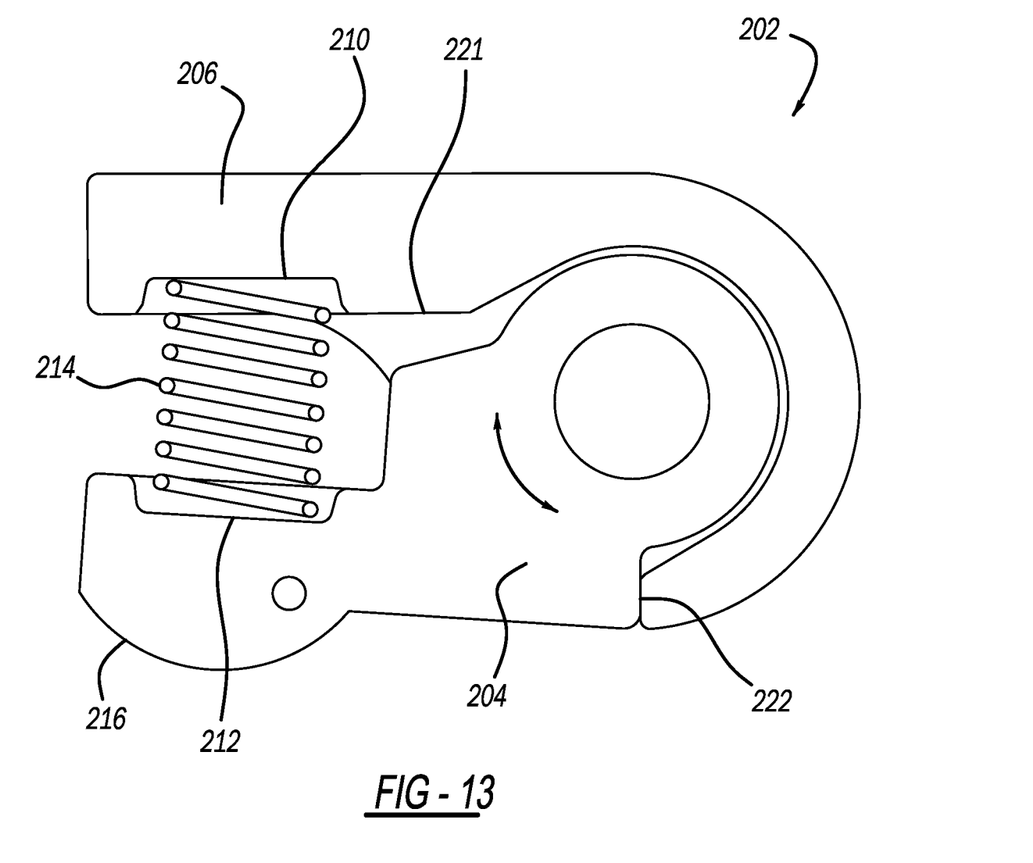
FIG. 13 is a side plan view of the two piece pawl according to the third embodiment of the invention.

The two piece pawl 202 has a bottom jaw 204, and an upper jaw 206 both pivotally mounted to the pivot 120 that is connected to one of the pawl mounting locations 112, 112' on the housing 110. The upper jaw 206 has an upper seat 210 and the bottom jaw 204 has a lower seat 212. A compliant spring 214 is positioned between the upper seat 210 and the lower seat 212 and biases the bottom jaw 204 and upper jaw 206 away from each other. Also, as best shown in FIG. 13, the upper jaw 206 has an upper stop 221 and a lower stop 222 that the bottom jaw 204 pivots between. The upper stop 221 and lower stop 222 prevent the bottom jaw 204 and upper jaw 206 from opening beyond the uncompressed length of the compliant spring 214 or from compressing the compliant spring 214 too much to the point that it becomes solid or damaged. This will allow the overall height of the two piece pawl 202 in its most extended or collapsed state to be known, while also allowing the assembly of the two piece pawl 202 to be handled at an assembly plant where it less likely to fall out during assembly if there are no stop present.

The actuated locking pawl arrangement 200 further includes the actuator 122', which in this embodiment is a solenoid connected to the housing 110 with a shaft 124' extending into the housing 110 and in contact with the bottom jaw 204 of the two piece pawl 202. The bottom jaw 204 of the two piece pawl 202 has a radius 216 that contacts a shaft radius 218 on the shaft 124 to provide a smooth motion between the actuator 122' and the bottom jaw 204. Located around the pivot 120' is a return spring 220 that connects between the bottom jaw 204 and the housing 110. The return spring 220 moves the bottom jaw 204 into contact with the lower stop 222 formed on the upper jaw 206 in order to move the entire two piece pawl 202 to the tucked position when the shaft 124' moves to the retracted position.

Operation of the actuated locking pawl arrangement 200 is shown in FIGS. 10-12. In FIG. 10 the shaft 124' is moved to a retracted position and the two piece pawl 202 is pivoted to a nested position by the bias of the return spring 220 as shown in FIG. 10. The shaft radius 218 can either be in contact with the radius 216 of the shaft 124' or can be retracted to the point that there is no contact.

To deploy the actuated locking pawl arrangement 200 the actuator 122 is operated and the shaft radius 218 of the shaft 124 moves upward and contacts (if not already in contact) and provides force on the radius 216 of the bottom jaw 204. This pushes on the compliant spring 214, which transfers upward force to the upper jaw 206 causing the entire two piece pawl 202 with upper jaw 206 to move upward toward the gear 224. If the gear 224 is spinning at a high rpm when the upper jaw 206 of the two piece pawl 202 comes into contact with the gear 224, the upper jaw 206 will be deflected back down towards the bottom jaw 204 and the compliant spring 214 will push the upper jaw 206 back upward creating a ratcheting mode as the upper jaw 206 gets pushed back and forth from the movement of the moving gear 224 and the force of the compliant sprint 214. The ratcheting mode is shown in FIG. 11. The ratcheting mode occurs due to the actuator force being higher than the ratcheting force and the coil spring force is lower than the actuator force. If the gear 224 were to slow down enough for the upper jaw 206 to engage with a tooth on the gear 224 (as shown in FIG. 12) the upper jaw 206 will lock the gear 224 in place, and the torque load will transfer through the upper jaw 206 into the back of pocket of the housing 110 that the two piece pawl 202 sits. When the actuator 122 is de-energized and there is not torque load on the gear, the two piece strut 202 will tuck into the housing 110 due to the force provided by the return spring 220 which reacts between the housing 110 and the bottom jaw 204. The ratcheting mode will keep occurring until either the shaft 124 moves back to the disengage position as shown in FIG. 10 or until the gear 224 slows down enough that the upper jaw 206 engages the teeth and locks the gear 225 from motion as shown in FIG. 12.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An actuated locking pawl arrangement with a motion compliance mechanism for use with an automotive system comprising:
   a rotating hub having a plurality of teeth separated by tooth space between each adjacent pair of the plurality of teeth, wherein each tooth space includes a front tooth profile of one of the plurality of teeth of the adjacent pair of the plurality of teeth and a back tooth profile of a second one of the plurality of teeth of the adjacent pair of plurality of teeth, each front tooth profile of all the plurality of teeth have a first depth angle and each back tooth profile of all the plurality of teeth have a second depth angle, wherein the first depth angle is different from the second depth angle;
   a pawl movable between a disengaged position where the pawl is not in contact with the rotating hub, an engaged position where the pawl is in contact with the rotating hub and an intermediate position between the disengaged position and the engaged position;
   a locking cam in contact with the pawl, wherein the locking cam moves between a disengaged position such that the pawl is disengaged with the rotating hub, an engaged position such that the pawl is in contact with the rotating hub and an intermediate position between the disengaged position and the engaged position of the locking cam;
   an actuator connected to the locking cam, wherein the actuator moves between a retracted position and an extended position;
   wherein the motion compliance mechanism is connected between the actuator and the locking cam that allows the actuator to move to the extended position when the locking cam cannot move past the intermediate position, wherein the motion compliance mechanism maintains a force on the locking cam until the rotating hub moves to a position where the pawl moves to the engaged position and the locking cam moves to the engaged position as a result of the force applied by the motion compliance mechanism, and
   wherein the actuator is a linear actuator having a shaft that moves linearly between the retracted position and the extended position and the motion compliance mechanism includes a compression spring disposed about the shaft and retained between an upper washer that is fixed to the shaft and a lower washer that is capable of sliding on the shaft so that if the locking cam cannot move past the intermediate position the shaft of the linear actuator will slide through the lower washer and through an aperture in the locking cam to allow the shaft of the actuator to move to the extended position, and the compression spring will become compressed as the shaft slides and the upper washer moves toward the lower washer which is abutted against the locking cam, wherein the compression spring acts on the lower washer to provide the force on the locking cam.

2. The actuated locking pawl arrangement of claim 1 wherein the first depth angle and second depth angle is determined by one or more factors selected from the group consisting of a diameter of the rotating hub, the number of the plurality of teeth, a depth of the tooth space and the location and angle of engagement of the pawl.

3. The actuated locking pawl arrangement of claim 1 wherein the linear actuator is one selected from the group comprising a solenoid actuator, screw actuator, cam actuator, hydraulic piston actuator, pneumatic cylinder actuator and linear servo actuator.

\* \* \* \* \*